United States Patent [19]

Matsuoka et al.

[11] Patent Number: 5,702,159
[45] Date of Patent: Dec. 30, 1997

[54] CUSHION BODY STRUCTURE OF A CAR SEAT

[76] Inventors: Chikara Matsuoka, 33-15, Wada 3-chome, Tamano City, Okayama Prefecture 706; Takeshi Watadani, 564-A302, Kojima-Hiedacho, Kurashiki City, Okayama Prefecture 711; Kunihisa Wakimoto, 919-4, Kawairi, Okayama City, Okayama Prefecture 701-01; Yukihiro Kinoshita, 4021-1, Tamashima-Michiguchi, Kurashiki City, Okayama Prefecture 713, all of Japan

[21] Appl. No.: 446,596

[22] PCT Filed: Apr. 25, 1994

[86] PCT No.: PCT/JP94/00684

§ 371 Date: Jun. 9, 1995

§ 102(e) Date: Jun. 9, 1995

[87] PCT Pub. No.: WO95/08507

PCT Pub. Date: Mar. 30, 1995

[30] Foreign Application Priority Data

Sep. 19, 1993 [JP] Japan .................. 5-254797

[51] Int. Cl.$^6$ ........................................... A47C 7/02
[52] U.S. Cl. ............... 297/452.48; 297/218.2; 297/452.26; 297/DIG. 1; 297/DIG. 2
[58] Field of Search ............... 297/452.58, 452.57, 297/DIG. 1, DIG. 2, 452.23, 452.24, 452.26, 452.25, 452.27, 218.2, DIG. 6, 452.48; 264/45.1, 46.4; 156/245, 212, 213

[56] References Cited

U.S. PATENT DOCUMENTS

| 4,699,427 | 10/1987 | Kobayashi | 297/DIG. 1 X |
| 4,738,809 | 4/1988 | Storch | 297/410 X |
| 4,755,411 | 7/1988 | Wing et al. | 297/DIG. 1 X |
| 4,795,215 | 1/1989 | Shimada | 297/DIG. 1 X |
| 4,865,279 | 9/1989 | Aoki et al. | 297/DIG. 1 X |
| 4,925,513 | 5/1990 | Witzke et al. | 297/DIG. 1 X |
| 4,975,135 | 12/1990 | Lowe | 297/DIG. 1 X |
| 4,985,189 | 1/1991 | Sugiura et al. | 264/46.4 X |
| 5,016,941 | 5/1991 | Yokota | 297/DIG. 1 X |
| 5,269,590 | 12/1993 | Carilli | 297/DIG. 1 X |
| 5,468,434 | 11/1995 | Powell et al. | 264/46.4 X |

FOREIGN PATENT DOCUMENTS

| 2 115 433 | 11/1971 | France | B29D 27/00 |
| 2 423 666 | 2/1978 | France | F16B 5/07 |
| 1953004 | 4/1971 | Germany | 156/245 |
| 1233513 | 10/1986 | Japan | 297/452.26 |
| 9479 | 1/1988 | Japan | 297/DIG. 1 |
| 5916 | 2/1989 | Japan | 156/245 |

*Primary Examiner*—Milton Nelson, Jr.
*Attorney, Agent, or Firm*—Renner, Kenner, Greive, Bobak, Taylor & Weber

[57] ABSTRACT

A cushion body (10) for forming a car seat, which facilitates attachment of a skin material (15) to a cushion material (11).

The cushion body (10) is made by attaching a planar fastening body (12) in a cushion material molding die (20) and unifying with the cushion material (11) along a three-dimensional curved surface shape of an interior surface of the die by an internal foamed molding pressure of the cushion material (11). The planar fastening body (12) is made of a planar fastening material (13) connecting with a supporting material (14) which is basically the same composition as the cushion material (11).

8 Claims, 2 Drawing Sheets

CUSHION BODY STRUCTURE OF A CAR SEAT

TECHNICAL FIELD

The present invention relates to a cushion body for an automobile seat and, in particular, relates to a cushion body of an automobile seat to which a surface material is attached through a fastener member fixed conformably on a three-dimensional curved surface of a cushioning material forming the cushion body.

BACKGROUND OF THE ART

Several methods for fixing a surface material on a surface of a cushioning material which is made of a foamed body and is a main part of an automobile seat have been known and used in public. In the prior art, in order to fix a surface material on a cushioning material having a concave surface shape about the center thereof, a back side surface of the surface material was bonded on a surface of the cushioning material, or a surface material was fixed on a cushioning material by pouring urethane in a mold after setting the surface material therein. However, in such methods for fixing or bonding a surface material on a cushioning material, their own production systems are required, and it is difficult to install such systems in a continuous assembly line. Thus, the cost for installing the system is increased. Also, because automobile seats are made by mass production, it is required to maintain high productivity because a lower volume results in a rise in cost.

In order to avoid such disadvantages, a flat fastening material is used for attaching a surface material on a cushioning material. This flat fastening material is called a flat fastener or flat fastener material. The fastener is made of tufting many hooked or ring-shaped small protrusions on a base sheet of the fastener. The hooked or ring-shaped small protrusions can hook and mechanically attach to a fabric which forms the back side of the surface material. It is found that since the surface material can be easily separated away from the fastener, while the surface material cannot be moved in a direction parallel to the fastener, such a fastener material as means for attaching a surface material on a cushion body is relatively superior.

Since this flat fastener material is basically a two-dimensional planar shape, if a seating part of a seat has a relatively flat planar shape, such a flat fastener material can be adhered to a flat surface of the seating part, and a surface material can be attached to the seat through the flat fastener material by pressurizing the flat fastener material thereon. However, if a seating part of a seat has a three-dimensional curved shape, it is difficult to conformably adhere such a flat fastener material to a three-dimensional curved surface of a cushioning material.

Therefore, an object of the present invention is to provide a cushion body of an automobile seat in which a flat fastener material is fixed conformably to a seating part of the seat having a three-dimensional curved surface shape.

DISCLOSURE OF THE INVENTION

For this, the present invention provides a cushion body consisting of a cushioning material having a three-dimensional curved surface and a fastener body consisting of a supporting material layer and a fastener material bonded thereon, wherein the fastener body is fixed on the cushioning material by positioning the flat fastener body in a mold for shaping the cushioning material along a three-dimensional curved shape of the mold and then pouring a liquefied foamable composition in the mold to form and shape the cushioning material in the mold. The fastener body is basically the same material as the cushioning material.

To fix the fastener material on the supporting material layer, an adhesive may be used. Alternatively, it may be done by setting the fastener material in a mold and pouring and molding a foamable composition forming the supporting material layer or slab in the mold so that the fastener becomes integral with the supporting material. When the cushioning material is made of urethane, it is preferable to use a urethane material (a slab) as the supporting material layer and to fix the fastener material on the slab by lamination. The thickness of the slab, which is not specially limited, is 5–15 mm and preferably 10 mm.

Such a fastener body is attached on at least a central main part of a seating portion of the cushioning material so that the cushion body is formed. Upon placing a surface material on the fastener body and strongly pressuring it, a fabric of a back surface of the surface material is securely hooked on the fastener material so that the surface material is attached on the cushion body, and thus an automobile seat may be easily and speedily produced. According to the present invention, by pre-producing a certain number of such a cushion body with the fastener body, it is possible to rapidly and competently respond to various orders by covering and attaching surface materials on the cushion bodies in accordance with the amount of orders received, and it is unnecessary to provide large scaled and ineffective production systems such as conventional surface integral molding, and it becomes easy to contribute to reducing the cost of the product.

BEST MODE FOR CARRYING OUT THE INVENTION

Figure 1:
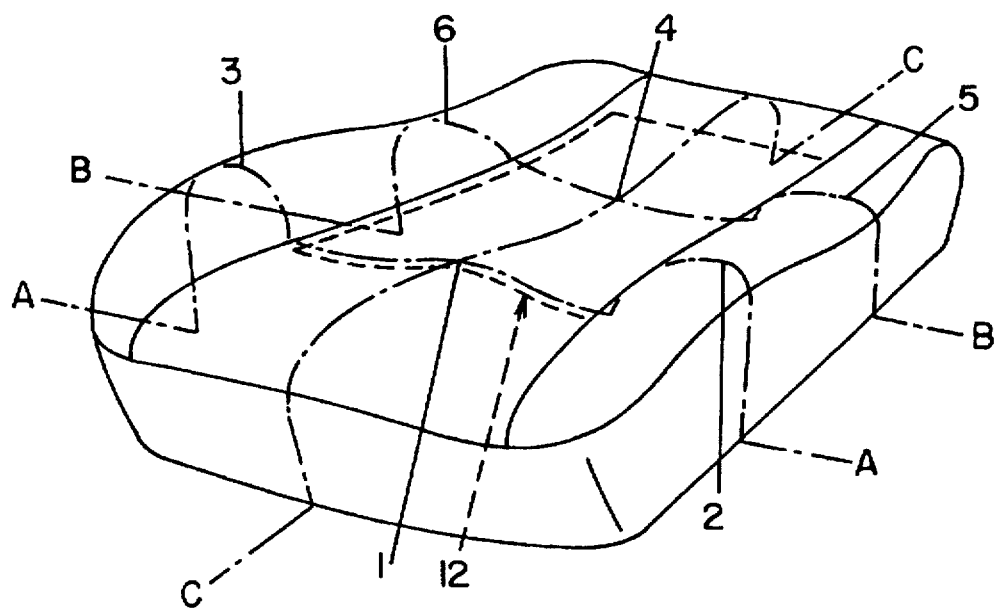
FIG. 1 is a perspective view depicting an automobile seat having a seating surface having a three-dimensional curved surface shape pursuant the present invention, and a fixation position of a fastener body according to the present invention is shown as an example by dotted lines.

Referring to the drawings, a preferred embodiment of the present invention is described in the following description.

FIG. 1 is a perspective view describing one example of an automobile seat. The seating surface of the seat is a three-dimensional curved surface depicted by three lines, A—A, B—B and C—C, to express the geometry of the curved surface. As seen by lines A—A and C—C, a front part of a central portion of the seating surface rises at the center (an intersection of A and C indicated by number 1) and lowered from the center to left and right hand sides, and a bucket-shaped seat is formed by sharply rising up at the left and right hand sides, as seen by numbers 2 and 3.

In contrast, as seen by line B—B, the rear part of the center is depressed at the intersection 4, and the seating surface is slightly rising up to the left and right hand sides and is then continuously rising up to the side portions 5 and 6. Both heights of the side portions 5 and 6 are smaller than the side portions 2 and 3. While a seat having such a three-dimensional curved surface formed thereon can be fitted with a figure of a person who sits on the seat, there has not existed a seat made by attaching a fastener material over such a three-dimensional curved surface before the present invention.

The fastener body 12 of the present invention is generally attached over the whole width of the center portion on a seat surface having such a three-dimensional curved surface. The fastener body 12 forms the three-dimensional curved surface together with a cushioning material (indicated by number 11 in FIG. 2), and the fastener body 12 and the side portions of the cushioning material 11 are covered with a surface material (indicated by number 15 in FIG. 2).

This cushion body 10 basically consists of a cushioning material 11 and a fastener body 12. The fastener body 12 must have a predetermined three-dimensional curved surface and is connected with the cushioning material 11.

In a preferred embodiment, the fastener body 12 to be attached to the cushioning material 11 is made by connecting the fastener material 13 (preferably, a hook or protrusion type surface fastener commercially sold by a company named KURARE Inc.) with a slab-urethane layer as a supporting material layer. Note that the fastener body 12 and the fastener material 13 are basically flat. While the fastener material 13 and the slab-urethane layer 14 may be bonded by an adhesive, it is preferable to fuse and laminate the fastener material 13 on the slab-urethane layer 14. The under surface of the slab-urethane layer 14 is connected with a cushioning material 11 made of a urethane foam, and such a connection is done by pouring urethane composition in a mold and foaming the composition therein. The cushion body 10 is made by connecting the cushioning material 11 with the fastener body 12. The seat is completed by attaching a suitable surface material 15 thereon. While the surface material 15 indicated by a dotted line covers only the left hand side of the seat in FIG. 2, the surface material 15 is also readily attached on the fastener material 13 and the cushioning material 11 on the right hand side, symmetrical to the left hand side. The back surface of the surface material 15 is attached to a plurality of fasteners 13' provided on the fastener material 13, and a good fastening force is exhibited thereby.

Figure 2:
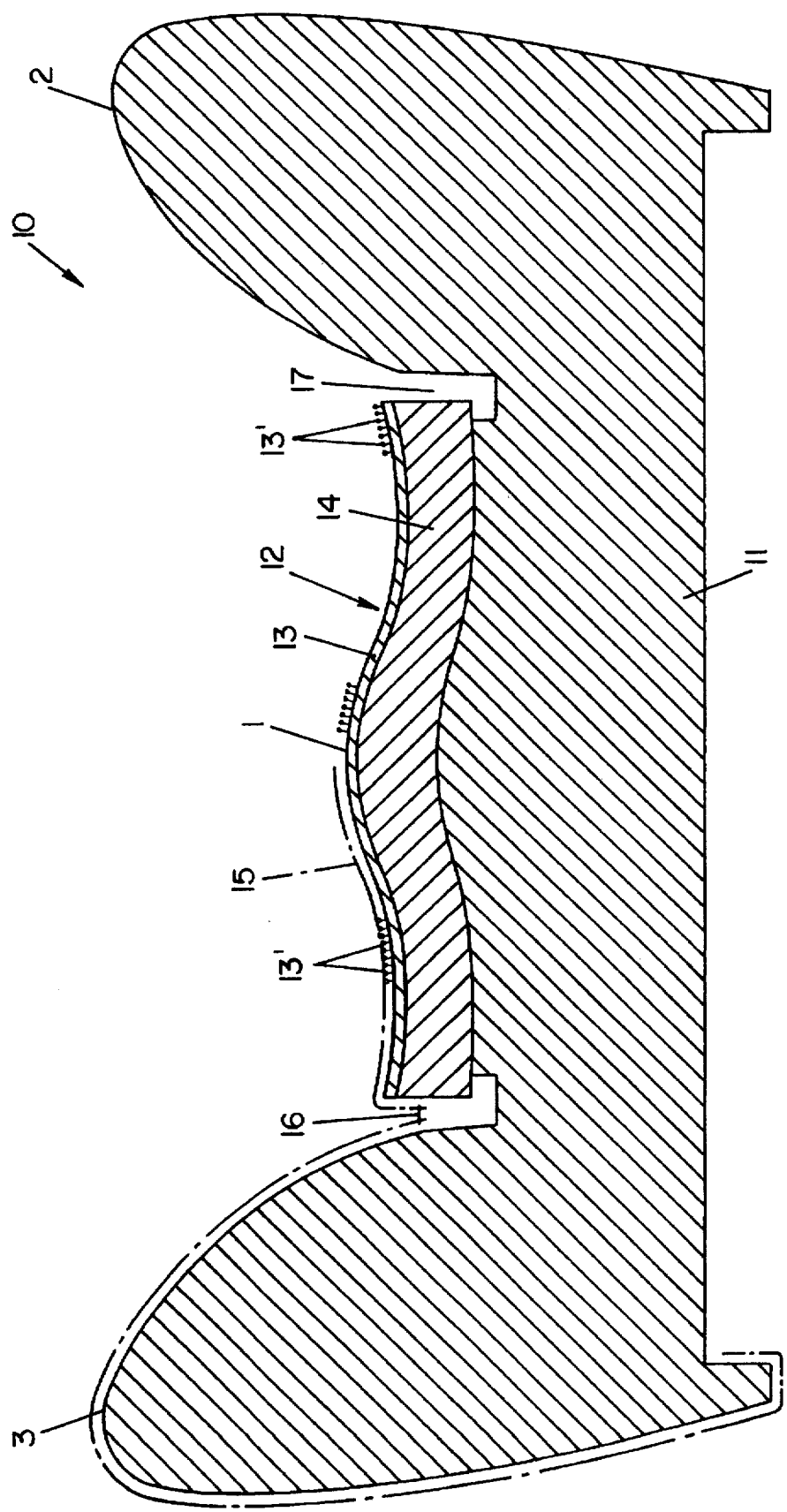
FIG. 2 is a cross sectional view of a cushion body taken along a line A—A of the seat shown in FIG. 1 with only a left hand side of a surface material attaching to a fastener material being shown by a dotted line.

In addition, a sutured part of the surface material 15 is shown as indicated by number 16 in FIG. 2. While the sutured part thereof is shown as accommodated in a gap 17 between the cushioning material 11 and the fastener body 12, it is not necessarily so limited in this configuration.

Figure 3:
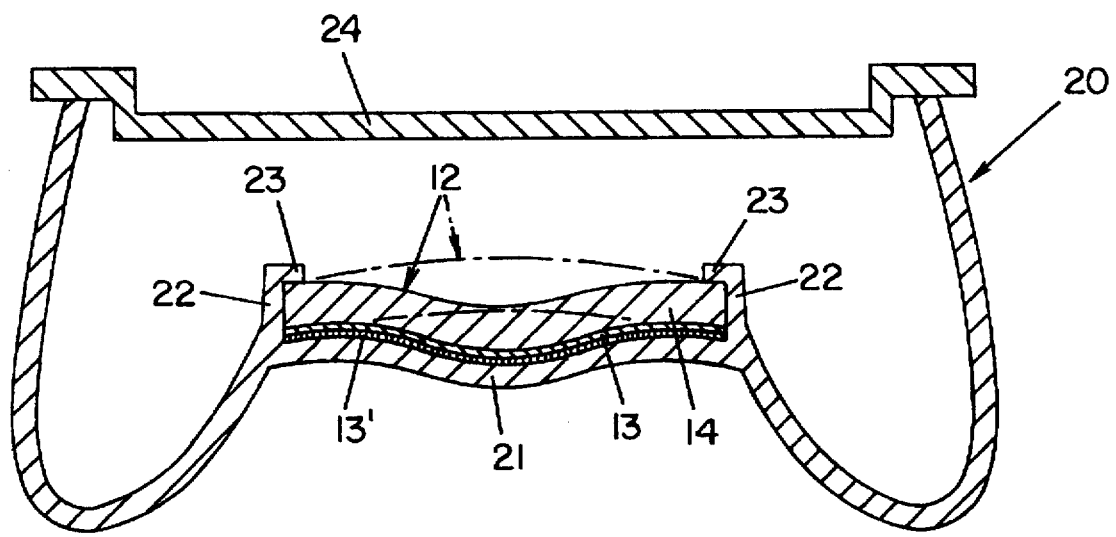
FIG. 3 is a sectional view of a mold forming a cushion body with a fastener body consisting of a fastener material and a supporting material shown in FIG. 2, and the fastener body attached to a surface of the mold is shown in a condition before pouring a foamable composition therein (by a dotted line) and is shown in a condition after foaming it (by a solid line).

Such a cushion body 10 of the present invention is manufactured by using a mold as shown in FIG. 3. In a lower portion 20 of the mold, the center portion thereof is a bottom surface 21 having a predetermined three-dimensional curved surface. A geometry formed by the lower portion 20 and an upper portion 24 of the mold shown in FIG. 3 is generally corresponding to a section cut along line A—A of FIG. 1 and the cross-sectional view depicted in FIG. 2. Thus, while in FIG. 3 the center of the bottom 21 is depressed to form a deeply depressed surface (corresponding to the center portion 1 of FIG. 1) in a section along line B—B, the center of the bottom surface 21 of the mold is, in contrast, protruded (corresponding to the center portion 4). Partitions 22 are provided face-to-face at both sides of the bottom, and each tip portion of the partition 22 is bent to form hook-shaped portion 23. The hook-shaped portions face each other and are bent inward. The fastener body 12 as mentioned above is set and clamped under the hook-shaped portions 23 in a state as shown by a dotted line in FIG. 3. After setting the fastener body 12 in the mold in such a manner, a liquefied foamable composition of urethane is poured downward in the mold. Then, an upper portion 24 of the mold is put on the lower portion 20, and the composition is foamed in the mold. Thereafter, the fastener body 12 is pressurized onto the bottom surface 21 of the lower portion 20 of the mold by the interior pressure due to expansion molding of the cushioning material 11, as indicated by the solid lines in FIG. 3, and the fastener body 12 is integrated with a foamed urethane (the cushioning material 11) along the predetermined three-dimensional curved surface of the bottom 21 of the mold. After the composition is hardened, the cushion body 10 is removed from the mold by opening the upper portion 24 of the mold. Slab-urethane 14 positioned on the end portion of the fastener body 12 is soft so that the fastener body 12 clamped in the partitions 22 can be easily taken out therefrom, by-passing the hook-shaped portions 23.

As a preferred embodiment, a seat having a three-dimensional curved surface corresponding to a figure of a person who sits thereon as shown in FIGS. 1 and 2, has the fastener body 12, which consists of the fastener material 13 (of a surface fastener of KURARE) and foamed urethane foam 14 (a slab-urethane layer) as a supporting material having a selected thickness of 5–15 mm and a density of 0.018 g/cm$^3$–0.040 g/cm$^3$. The suitable thickness and density depend on a feeling to sit and a required curved surface shape.

In practice, for a seat shape having 10 mm in depth of a curved depressed surface, the fastener body 12 is made of a supporting material of a urethane foam having a thickness of 10 mm and a density of 0.034 g/cm$^3$.

Also, it is found that a feeling to sit can be better by forming a gap 17 by opening the periphery of the fastener body 10 in a range of 5–20 mm from the side portion of the cushioning material 11, dependent on the dimension of the bucket of the seat.

AVAILABILITY IN INDUSTRIES

As described above, in accordance with the present invention, a fastener body consisting of a fastener material connected with a supporting material layer, which is basically the same material as a cushioning material, is fitted with an interior geometry of a mold for shaping the cushioning material and the fastener body, and a cushion body is formed by integrating the fastener body with the cushioning material along a predetermined three-dimensional curved shape by an internal pressure due to expansion molding of the cushioning material.

That is, it is achieved by the present invention to form a fastener material having a predetermined or desired three-dimensional curved surface. This has not been able to be achieved by the prior art.

The three-dimensional curved surface is structured by positioning the fastener body into the cushioning material so that an automobile seat using this cushion body can provide good feeling to a person who sits down thereon and can provide comfort to the person, as the cushion body fits with the figure of the person.

The most important factor is that by embodying a cushion body with such a fastener material, the step of attaching a surface material thereon is facilitated, it avoids providing production equipment as used in the prior art, it enables rapid response to variation of production, and high-quality automobile seats can be supplied rapidly without a substantial cost increase.

We claim:

1. A vehicular seat cushion comprising, a cushioning material having a seating surface with a center portion and rising side portions to either side of said center portion, said center portion of said seating surface having a three-dimensional curved surface, a fastener body having an under surface affixed to said center portion of said seating surface and an upper surface duplicating said three-dimensional curved surface of said center portion of said seating surface, said upper surface of said fastener body having a plurality of fasteners disposed thereon, and a surface material covering said cushioning material and attached to said plurality of fasteners, whereby said surface material assumes said three-dimensional curved surface of said seating surface.

2. A vehicular seat cushion according to claim 1, wherein said surface material has a suture at substantially the juncture between said rising side portions of said seating surface and said fastener body.

3. A vehicular seat cushion according to claim 1, wherein said fastener body comprises a urethane foam slab and a fastener material fixed thereon.

4. A vehicular seat cushion according to claim 3, wherein said urethane foam slab and said fastener material are fixed to each other by lamination.

5. A vehicular seat cushion according to claim 1, wherein said fastener body includes a foam slab layer affixed to said center portion of said seating surface and a fastener material on said upper surface carrying said plurality of fasteners.

6. A vehicular seat cushion according to claim 5, wherein said center portion of said seating surface is a foam which is attached to said foam slab by expansion molding.

7. A vehicular seat cushion according to claim 5, wherein said fastener material is laminated to said foam slab layer.

8. A vehicular seat cushion according to claim 5, wherein a gap is formed between said rising side portions of said seating surface and said fastener body in which a suture is positioned.

* * * * *